(12) United States Patent
Betros et al.

(10) Patent No.: US 7,962,624 B2
(45) Date of Patent: *Jun. 14, 2011

(54) SYSTEM AND METHOD FOR COLLABORATIVE PROCESSING OF DISTRIBUTED APPLICATIONS

(75) Inventors: Robert Betros, San Diego, CA (US); Mansour Raad, Winchester, MA (US)

(73) Assignee: Sorteo Games, San Diego, CA (US)

( * ) Notice: Subject to any disclaimer, the term of this patent is extended or adjusted under 35 U.S.C. 154(b) by 1334 days.

This patent is subject to a terminal disclaimer.

(21) Appl. No.: 11/485,229

(22) Filed: Jul. 11, 2006

(65) Prior Publication Data

US 2006/0253535 A1    Nov. 9, 2006

Related U.S. Application Data

(63) Continuation of application No. 09/766,382, filed on Jan. 19, 2001, now Pat. No. 7,080,120.

(51) Int. Cl.
   *G06F 15/16* (2006.01)
(52) U.S. Cl. .................................. 709/227
(58) Field of Classification Search ............ 709/224, 709/227, 219
   See application file for complete search history.

(56) References Cited

U.S. PATENT DOCUMENTS

| | | | |
|---|---|---|---|
| 5,426,637 A | 6/1995 | Derby et al. | |
| 5,590,281 A | 12/1996 | Stevens | |
| 5,793,972 A * | 8/1998 | Shane | 709/219 |
| 5,867,661 A * | 2/1999 | Bittinger et al. | 709/227 |
| 6,088,796 A | 7/2000 | Cianfrocca et al. | |
| 6,144,962 A | 11/2000 | Weinberg et al. | |
| 6,182,119 B1 | 1/2001 | Chu | |
| 6,192,394 B1 * | 2/2001 | Gutfreund et al. | 709/204 |
| 6,510,439 B1 | 1/2003 | Rangarajan et al. | |
| 6,529,949 B1 | 3/2003 | Getsin et al. | |
| 6,539,430 B1 | 3/2003 | Humes | |
| 6,571,275 B1 | 5/2003 | Dong et al. | |
| 6,604,125 B1 | 8/2003 | Belkin | |
| 6,606,660 B1 | 8/2003 | Bowman-Amuah | |
| 6,611,862 B2 | 8/2003 | Reisman | |
| 6,643,683 B1 | 11/2003 | Drumm et al. | |
| 6,839,762 B1 | 1/2005 | Yu et al. | |
| 6,880,010 B1 * | 4/2005 | Webb et al. | 709/227 |
| 7,216,351 B1 * | 5/2007 | Maes | 719/328 |
| 2001/0042094 A1 * | 11/2001 | Mitchell et al. | 709/203 |

(Continued)

OTHER PUBLICATIONS

J. Van Den Broecke, "Pushlets: Send events from servlets to DHTML client browsers", JavaWorld.com, Mar. 1, 2000, pp. 1-15.

(Continued)

*Primary Examiner* — Benjamin R Bruckart
(74) *Attorney, Agent, or Firm* — Lewis and Roca LLP

(57) ABSTRACT

A system and method for maintaining direct, two-way asynchronous communication between a client and a web server. An HTTP-compliant request is communicated from a client to a web server. The HTTP request is configured to initialize a CGI that operates within or in conjunction with the web server. A task, associated with the CGI, is executed in accordance with the HTTP request. The task is configured to perform the two-way asynchronous communication with the client until terminated by the client or the CGI. The task includes an operation in which client request data is listened for and read by the CGI through the web server. The task further includes an operation in which data is created and sent by the CGI to the client through the web server.

40 Claims, 2 Drawing Sheets

U.S. PATENT DOCUMENTS

2002/0099795 A1  7/2002  Betros et al.
2002/0100026 A1  7/2002  Betros et al.

OTHER PUBLICATIONS

Kleinrock et al., "Packet Switching in Radio Channels: Part I-Carrier Sense Multiple-Access Modes and Their Throughput-Delay Characteristics", IEEE Transactions on Communications, vol. COM-23, No. 12, Dec. 1975, pp. 1400-1416.

Tobagi et al., "Packet Switching in Radio Channels: Part II—The Hidden Terminal Problem in Carrier Sense Multiple-Access and the Busy-Tone Solution", IEEE Transactions on Communications, vol. COM-23, No. 12, Dec. 1975, pp. 1417-1433.

Tobagi et al., "Packet Switching in Radio Channels: Part III—Polling and (Dynamic) Split-Channel Reservation Multiple Access", IEEE Transactions on Communications, vol. COM-24, No. 8, Aug. 1976, pp. 832-845.

Tobagi et al., "Packet Switching in Radio Channels: Part IV—Stability Considerations and Dynamic Control in Carrier Sense Multiple Access", IEEE Transactions on Communications, vol. COM-25, No. 10, Oct. 1977, pp. 1103-1119.

"Dot-Com Bubble", Wikipedia, the Free Encyclopedia, Jul. 8, 2007, pp. 1-12.

"Hypertext Transfer Protocol—HTTP/1.0", http://www.w3.org/Protocols/HTTP/1.0/draft-eitf-http-spec.html, Jul. 8, 2007, pp. 1-54.

Gundavaram, "CGI Programming on the World Wide Web", http://www.oreilly.com/openbook/cgi, Mar. 1996.

RFC 2616: Hypertext Transfer Protocol—HTTP/1.1, R. Fielding, etc., Jun. 1999.

S. Rangarajan, S. Yajnik, and P. Jalote, "WCP—A tool for consistent on-line update of documents in a WWW server", Computer Networks and ISDN Systems, vol. 30, issues 1-7. Article :FP32, Proceedings of the Conference on the World-Wide Web (WWW7), Apr. 1998; as downloaded from http://www7.scu.edu.au/1858/com1858.htm, on Nov. 29, 2005.

HTTP persistent connection, Wikipedia, the free encyclopedia, 2 pages last modified Dec. 26, 2010.

"Hypertext Transfer Protocol—HTTP/1.1," http://www.w3.org/Protocols/rfc2616/rfc2616.html, 6 pages, last modified Sep. 1, 2004.

\* cited by examiner

SYSTEM AND METHOD FOR COLLABORATIVE PROCESSING OF DISTRIBUTED APPLICATIONS

CROSS-REFERENCE TO RELATED PATENT APPLICATIONS

This application is a continuation of U.S. patent application Ser. No. 09/766,382, filed Jan. 19, 2001, entitled "System and Method for Collaborative Processing of Distributed Applications", and issued as U.S. Pat. No. 7,080,120 on Jul. 18, 2006, the contents of which are incorporated by reference herein.

BACKGROUND OF THE INVENTION

The present invention generally relates to computer systems, and more particularly to executing collaborative application software in a computer network.

Computer networks have become an important platform for storing and delivering application programs to users. In a model widely referred to as client/server, an application server is considered a central hub from which a number of clients can request and receive application software for performing a specific function. In the past, most applications were executed locally at a client, with application software that was locally stored in the client platform. Today, however, in one configuration, applications are stored in a central server, and delivered to a client in components for local processing. Another common configuration is for the client to send processing requests to the server, which executes the application that is specified in the request on the server and sends the results back to the client for local processing. In this configuration, the application is maintained in the server.

The tremendous growth of use of the Internet and World Wide Web (the "Web") in the past few years has resulted in increasingly more communication between clients and servers. Most of the communications in the short history of the Web relate to delivery of requested content data from a web server to a client. A web server is a specialized type of server that communicates according to a particular protocol, the hypertext transport protocol, or HTTP. Other hypermedia protocols are also used or are being developed.

Traditionally, Internet-based application processing in a client/server model occurs mostly through a web server. Network-based applications for the client/server model, such as those through the Web, are becoming increasingly complex and interactive. Problems with current software infrastructure for administering network-based applications include difficulty in the creation and delivery of application components, complexities of managing the interface between a client and a server, and processing delays and inefficiencies. The current and next generations of the Web, in its Internet, intranet and extranet embodiments, demand a platform-neutral architecture that can effectively handle complex Web-based distributed client/server applications for collaborative processing.

SUMMARY OF THE INVENTION

This invention relates to a system and method whereby one or more common gateway interfaces (CGIs) are enabled to function together. This invention provides a method and system for standardizing the execution, administration and intercommunication of application components running in conjunction with CGIs as well as with applications running on other hosts.

In accordance with one embodiment of the invention, a system includes at least one application context in which an application is executed, the context including an application CGI for managing the application, and a communication interface on which application data is communicated as messages. The system further includes a messaging bus configured to communicate the messages for processing by the application. The messaging bus can communicate to remote hosts via a multicast communication path, or to remote clients via a multibus extension.

DETAILED DESCRIPTION OF THE PREFERRED EMBODIMENTS

This invention relates to executing and processing applications. An application is software that performs specific logic. As used herein, the term application refers to an entire application, or an application component that defines a portion of an application. A number of application components can work together to execute the logic of the application. In one embodiment, this invention provides a method for communication between client-side application components and server-side application components. Further, the invention provides for the execution and administration of applications residing within a CGI engine hosted on a server platform. The invention provides a structure for performing collaborative processing with distributed applications.

In a preferred embodiment of the invention, a system and method for collaborative processing of distributed applications is embodied as one or more computer programs configured to work together. Every computer program includes at least one code section and at least one data section. The code section is a sequence of bytes that can be executed directly by the central processing unit (CPU) of a host. The data section includes sequences of bytes that may be executed by the CPU of the host, but which are mostly used to store data structures for use by the code section.

Figure 1:
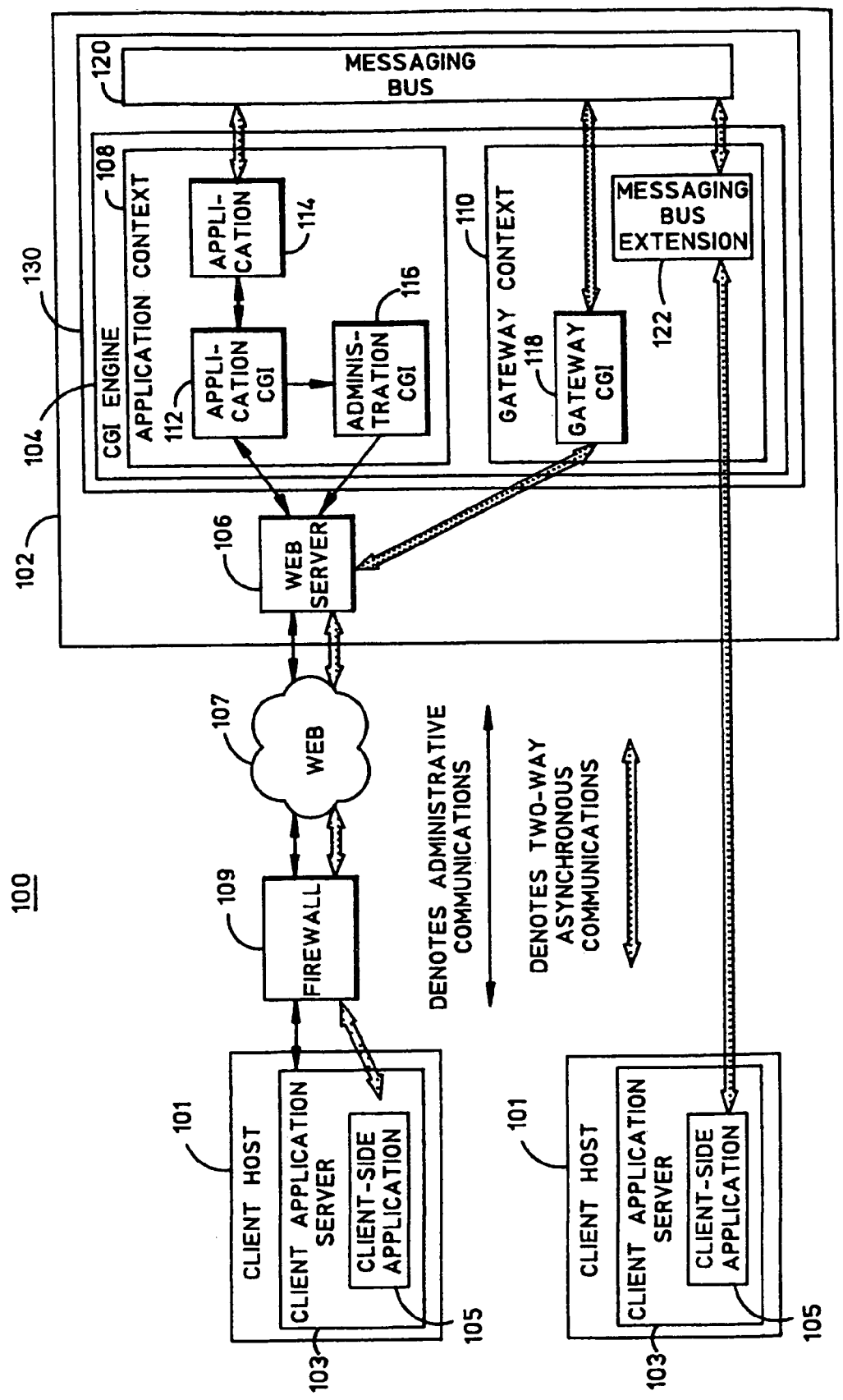
FIG. 1 shows a system for collaborative processing with distributed applications, according to one embodiment of the invention.

FIG. 1 shows a system 100 for collaborative processing of distributed applications, according to one embodiment of the invention. The system 100 includes a host 102. In one embodiment, the host 102 is a physical machine having an operating system that manages one or more computer programs. A computer program can include one or more operations running within it that share the same data section of the computer program. The host 102 can also include a CPU that executes the code section of the computer programs. The computer programs can be resident on the host 102 in permanent or temporary storage, or can be communicated to the host 102 by external computer programs.

The host 102 includes a computer program 130, which includes a CGI engine 104, which in an embodiment is an operation configured to execute and administer one or more CGIs, and a messaging bus 120, which in an embodiment is another operation configured to enable multiple operations within the computer program to communicate with each other. In a specific exemplary embodiment, the CGIs administered by the CGI engine 104 are servlets. A servlet is a particular type of CGI that can be configured to execute a certain function, such as manage an application, for example.

While a servlet is typically written in the Java programming language, a CGI can be written according to other programming languages or logic structures. According to the invention, the CGI engine 104 is configured to function as an application server, including, without being limited to, logging information related to the use and operation of applications, authentication of users of CGIs, and authorization of the usage of the CGIs.

The host can also include a web server 106. The web server 106 functions as a conventional web server that communicates with a client according to the hypertext transfer protocol (HTTP). As used herein, HTTP means any application-level protocol that is supported by a web server or a web browser, including but not limited to secure HTTP (HTTPS). In an embodiment of the invention, the web server 106 also communicates with the CGI engine 104, from which the web server 106 executes one or more CGIs running in the CGI engine 104. In a specific embodiment, the web server 106 invokes and executes one or more servlets, through which communications are performed between the web server 106 and an application 114. One particular type of CGI according to the invention is an application CGI 112. The application CGI 112 is configured to execute and manage an associated application 114, in response to requests received from the web server 106. The application CGI 112 can be a servlet. One specific type of servlet for the application CGI is called a sublet. A sublet is a servlet extension that is specifically configured for executing and managing an associated application.

The CGI engine 104 can be configured with at least two contexts for running CGIs. One context is an application context 108. The application context 108 is a self-sustained environment of resources within the CGI engine 104 that is configured to, but not limited to, enable multiple CGIs and other programs to commonly share resources. The application context 108 also provides a secure environment in which an application CGI 112 and an application 114, and its supporting resources, can operate shielded from corruption by other CGIs or applications running in the CGI engine 104. For each application 114, the CGI engine 104 is configured to create an application context 108 that includes an application CGI 112 and one or more administration CGIs 116 associated with the application CGI 112. The application context 108 enables CGIs, such as administration CGIs 116, and application CGIs 112 with features that include, but are not limited to, getting the actual location of a physical resource within the host 102 from a representation of that resource, and logging messages and exceptions being generated by the application. The application context 108 is further configured to enable the application 114 to get a reference, i.e. find where in a memory, to other applications within the CGI engine 104 that are registered to communicate with the application 114. The reference can be based on a name of the application 114.

A second context is a gateway context 110, an environment having resources for performing two-way asynchronous communication between applications on the same host and different hosts. One form of such communication is notification, in which two programs, or two operations within a program or within multiple programs, communicate data with each other without being polled for the data by the other.

Applications 114 within the CGI engine 104 communicate with each other asynchronously via a messaging bus 120. In a specific embodiment, the messaging bus 120 has multiple inputs and outputs and is configured to communicate data between associated inputs and outputs. A unit of information that enters and leaves the messaging bus 120 is a message. There are multiple pairs of entry and exit points on the messaging bus 120. Each pair represents a topic. Publishing is the act of sending a message to a topic on the messaging bus 120. Subscribing is the act of registering to a topic, and receiving the messages published on that topic. An application 114 can be both a publisher and subscriber to one or more topics. When a message is published to a particular topic, the message is communicated to all subscribers registered to that topic simultaneously. In this way, collaborative communication and processing between publishers and subscribers to a topic, through a particular application, is enabled.

For efficient communication between applications, an application 114 or client-side application 105 can employ a filter on the messaging bus to scan the content of messages on a certain topic, and determine whether the application employing the filter will either process the message or disregard it. Such a filtering mechanism is described in U.S. patent application Ser. No. 09/766,383 entitled "System and Method for Generating Machine-Language Code from Readable Text Code for Information Filtering" published as U.S. Patent Application Publication Number 2002/0100026 A1 on Jul. 25, 2002, incorporated by reference herein for all purposes.

The messaging bus 120 can logically extend across multiple hosts, enabling external applications to communicate with applications 114 that reside within the local CGI engine 108. Extension of the messaging bus 120 can occur whether or not a firewall 109 or proxy server resides in the communication path between the local CGI engine 104 and the external applications. One example of an external application is a client-side application 105 that resides in a client host 101 and runs within a client application server 103.

Figure 2:
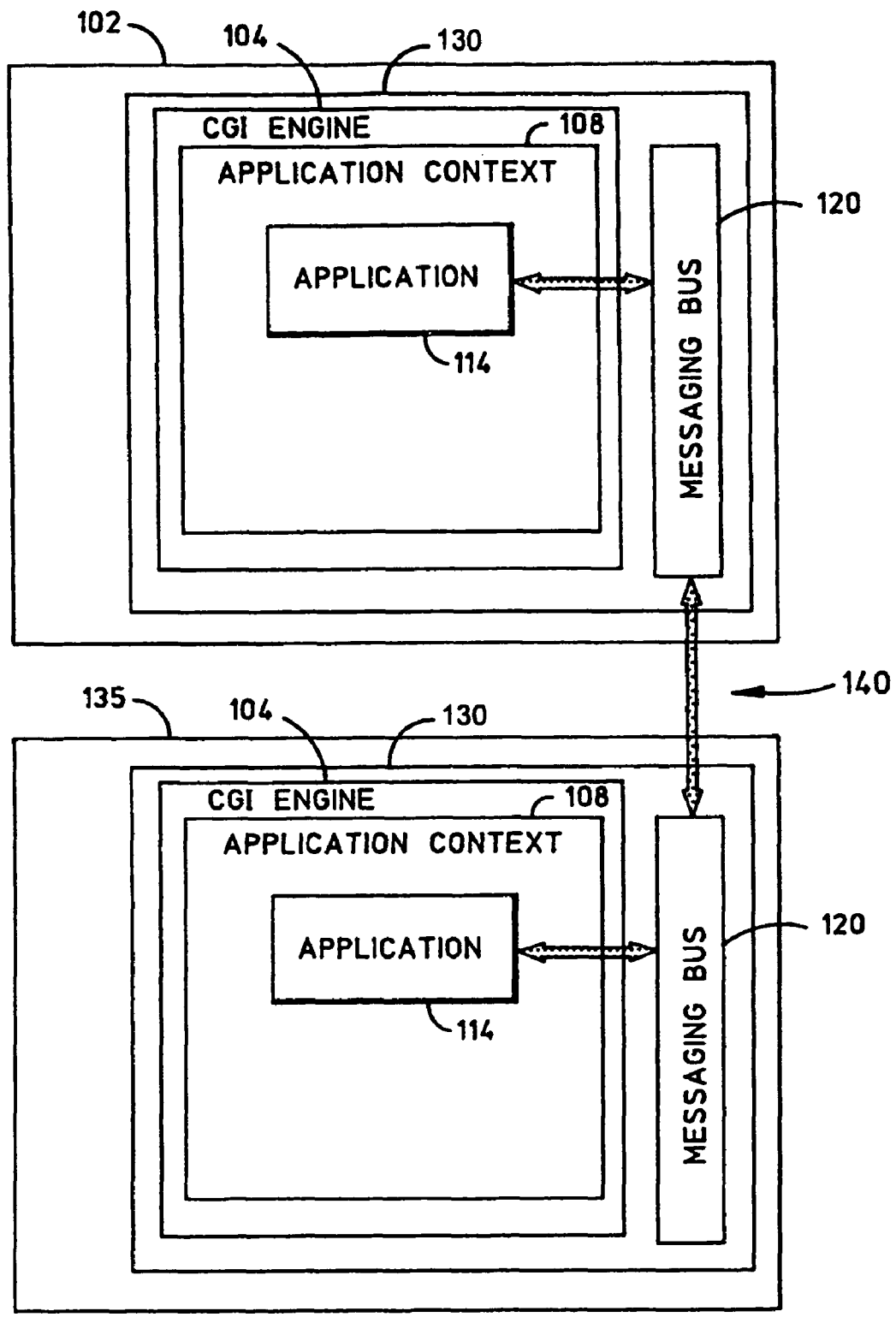
FIG. 2 shows communication between a host and a remote host via the messaging bus.

In one embodiment, the messaging bus 120 is extended through the use of a multicast protocol and configured to communicate with one or more other messaging busses, and wherein each other messaging bus is resident on a remote host 135. FIG. 2 illustrates a multicast communication path 140 between the host 102 and any remote host 135. Each host must support this protocol.

When the communication path does not support the multicast protocol, an external application can communicate asynchronously with the messaging bus 120 through a direct socket connection to the messaging bus extension 122. In one embodiment, the messaging bus extension 122 is created using the socket select method. The socket select( ) method enables the efficient handling of large numbers of simultaneous socket connections to the messaging bus 120. The socket select( ) method, which can be executed by the operating system of the host 102, waits until information is available on any of the open socket connections to the host 102. Upon the arrival of the information, the socket select( ) method returns a data structure that indicates which socket connections have information available to be processed. The messaging bus extension 122 uses the information within the returned data structure to read the available information from each specified socket connection. The information read from each socket is converted to a message and published onto the messaging bus 102 on a specific topic.

The messaging bus extension 122 multiplexes the input and output operations of the socket to publish and subscribe messages. The multiplexing can be directed by the operating system of the host 102.

When the host 101 is located behind a firewall 109 or proxy server, the extension of the messaging bus is implemented as described in U.S. patent application Ser. No. 09/766,439 entitled "System and Method for Maintaining Two-Way Asynchronous Notification Between a Client and a Web Server" published as U.S. Patent Application Publication Number 2002/0099795 A1 on Jul. 25, 2002, incorporated by reference herein for all purposes. A gateway CGI 118 implements the two-way asynchronous communication through a firewall 109 or proxy server. In one embodiment, the gateway CGI 118 can be one or more servlets, administered and executed within the gateway context 110. When an external application that is not behind a firewall 109 or proxy server communicates messages to the messaging bus 120, a messaging bus extension 122 is used.

External applications can reside on another host, or on the same host 102 in another CGI engine. External applications can also reside on a client host 101, where they are executed as a client-side application 105. A client host 101 can include a client application server 103 in which the client-side application 105 is pre-installed, or to which the client-side application 105 is dynamically delivered from the web server 106 in the host 102.

The CGI engine 104, in communication with the web server 106, provides one form of access to the application 114. The web server 106 is configured to direct certain client requests from a client 101 to the relevant application CGI 112 in the CGI engine 104.

In an exemplary embodiment of the invention, the application CGI 112 is configured as a sublet and interacts with the application 114 according to an interface definition. In a specific embodiment, the interface definition is an extension of a servlet interface definition. This interface definition includes, without limitation, the following operations:

a) an initialization operation that accepts as an argument the application CGI configuration, b) a service operation to return information about the associated application 114, c) a destroy operation to be invoked by the termination of the execution of the CGI engine 104 that enables the release of reserved resources and terminates the application CGI 112 and its associated application 114, d) operations to load and save the current state of the associated application 114, e) operations to set and get the internal attributes of the associated application 114, f) an operation to invoke an operation within the associated application 114.

The initialization operation of each application CGI 112 receives the application CGI configuration and applies it to the associated application 114 to prepare it for use. The application CGI configuration includes, without limitation, the following information:

a) a list of initialization parameter names, b) an initialization parameter value for a given a parameter name, c) a reference to the application context 108.

The service operation of the application CGI 112 gathers and returns information about the associated application 114. This information includes without limitation:

a) a list of information about the attributes of the application 114 that includes the attribute name, description, type, and read/write accessibility, b) a list of information about the operations within the application 114 that includes each operation's name, description, type of information returned and information about the operation's parameters. Information about an operation parameter includes the parameter name, description and type.

The application CGI 112 can handle HTTP requests through its service operation. The implementation of the service operation in the application CGI 112 is used to administer the associated application 114. The administration includes, but is not limited to, the retrieval of information about the application 114, the retrieval and modification of its attribute values, the invocation of an operation within the application 114 and the saving of the current state of the application 114. The information and status returned from the administrative tasks is forwarded to the administration servlet 116 to format this information for presentation purposes.

Operation of the system 100 is as follows. In one embodiment, the CGI engine 104 administers the application 114 through the use of the web server 106. For instance, a client host 101 initiates the execution the application 114 by submitting an HTTP request to the web server 106 from the client-side application 105. The client-side application 105 can be, for example, an application running inside of a web browser program. The web server 106 redirects the request to the CGI engine 104. The CGI engine 104 invokes the application CGI 112 associated with the application 114 to process the request, which returns a response containing the result of the request to the web server 106 who forwards it on to the client host 101, for use by the client-side application 105.

When the CGI engine 104 starts, it loads the configuration files associated with each CGI. The content of a configuration file is called the CGI configuration. For each CGI in the CGI engine 104, the CGI engine 104 scans the CGI configuration to determine which of the CGIs needs to be instantiated at startup time. The CGI engine 104 invokes a standard initialization operation on each CGI that is instantiated with the CGI configuration as an argument. Upon the successful completion of the initialization operation, the CGI is registered to run within the CGI engine 104.

For the application CGI 112, the standard initialization operation composes a sublet configuration from the content of the scanned configuration file, and invokes the initialization operation of the associated application 114 with the application CGI configuration as an argument. If the initialization operation is successful, then the load operation of the application CFI 112 is invoked. The load operation is used to load the previously saved state of the application 114. When the CGI engine 104 is instructed to terminate the application CGI 112, the destroy operation in each registered CGI is invoked. This inherently invokes a sublet destroy operation to terminate the application 114.

Administrative actions that can be requested by the client host 101 from the client-side application 105 and executed by the CGI engine 104 include, without limitation, initiating and terminating the application 114, and modifying its logic flow.

When the messaging bus 120 is extended to a client-side application 105 running within the environment of the client application server 103, the client-side application 105 can publish, subscribe and process messages from the messaging bus 120. The client-side application 105 receives a message, processes the message, and composes a data structure that can be understood by the client application server 103. The client-side application 105 then delivers the data structure to the client application server 103 and instructs it to process the content of the delivered data structure.

In a specific exemplary embodiment of the invention, the administration CGI 116 is implemented using the Java Server Page (JSP) specification. The information forwarded to the administration CGI 116 is packaged as an attribute value within the HTTP request. The administration CGI 116 retrieves the attribute value and reformats it into a document that is readable by the requesting client application 103. In a preferred embodiment, the document format is in HTML. As used herein, HTML means any document format that is supported by a web browser, including but not limited to Dynamic HTML (DHTML).

In the specific exemplary embodiment, the client application server 103 is a web browser, the client-side application 105 is an HTML document with a Java Applet. The web server 106 that is running in conjunction with the CGI engine 104 delivers the HTML document with the Java applet to the web browser 103. Upon the completion of the delivery, the Java Applet is initiated and establishes a connection to the messaging bus 120 as described above. The Java Applet now contains an extension of the messaging bus 120 and is a publisher and/or subscriber to one or more topics on the messaging bus 120.

The Java Applet is configured to call specific functions in the HTML document upon the receipt of a message on a particular topic or topics. The functions within the HTML document or template accept as arguments the property values of the message and convert these values into a HTML formatted text string that is executed by a component within the HTML document or template.

In another embodiment, the client-side application 105 is a Java Applet and the HTML document or template can be delivered as a property value within a message. The Java Applet reads the HTML document or template within the message and instructs the web browser 103 to render the HTML document or template.

In still another embodiment, the client-side application 105 is a Java Applet that dynamically generates the HTML document or template and the result is forwarded to a component in the web browser 103 for rendering.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method for enabling two-way asynchronous communication between a client and a web server to occur using a single HTTP transaction, the method comprising:
    opening a single socket connection between a web server and a client, wherein the opening comprises the client opening a client-side component of the single socket and sending a notification to the web server, receipt of the notification causing the web server to open a server-side component of the single socket connection;
    communicating an HTTP request from the client to the web server over the one socket connection as part of the single HTTP transaction, wherein the HTTP request is a request for the web server to initialize a CGI that operates within or in conjunction with the web server;
    initializing, by the web server, the CGI after receiving the HTTP request from the client;
    executing, by the CGI after the CGI has been initialized, operations to enable two-way asynchronous communication between the client and the web server to occur over the one socket connection and wholly within the single HTTP transaction until the CGI operations are terminated by the client or the CGI; and
    closing, by the web server, the one socket connection after the CGI operations have been terminated.

2. The method of claim 1, wherein:
    the two-way asynchronous communication between the client and the web server over the one socket connection and wholly within the single HTTP transaction allows for sending of particular information from the web server to the client and for sending of information from the client to the web server;
    said particular information and said information being communicated in a protocol other than HTTP; and
    the web server is able to send the particular information to the client without receiving a request from the client for the particular information.

3. The method of claim 1, wherein executing operations includes receiving and processing data from the client.

4. The method of claim 3, wherein the data is compliant with the HTTP protocol or a protocol other than HTTP.

5. The method of claim 1, wherein executing operations includes creating and communicating data from the CCI to the client.

6. The method of claim 5, wherein the data is compliant with the HTTP protocol or a protocol other than HTTP.

7. The method of claim 1, wherein the client includes client-side logic configured to perform the two-way asynchronous communication with the web server.

8. The method of claim 7, wherein the client-side logic is pre-installed on the client.

9. The method of claim 7, wherein the client-side logic is dynamically delivered to the client from the web server.

10. The method of claim 1, wherein the client includes client-side logic written in Java™.

11. The method of claim 1, wherein the client includes client side logic that comprises an applet or a shockwave movie.

12. A system for enabling two-way asynchronous communication between a client and a web server to occur within a single HTTP transaction, the system comprising:
    means for opening one socket connection between the client and the web server;
    means for communicating an HTTP request from the client to the web server over the one socket connection as part of the single HTTP transaction, wherein the HTTP request is a request for the web server to initialize a CGI that operates within or in conjunction with the web server;
    means for initializing the CGI after the web server receives the HTTP request from the client;
    means for executing operations of the CGI after the CGI has been initialized, wherein the operations are configured to enable the two-way asynchronous communication between the client and the web server to occur over the one socket connection and wholly within the single HTTP transaction until the operations are terminated by the client or the CGI; and
    means for closing the one socket connection after the operations have been terminated;
    wherein the two-way asynchronous communication between the client and the web server over the one socket connection and wholly within the single HTTP transaction allows for sending of particular information from the web server, said particular information and said information communicated in a protocol other than HTTP; and
    wherein the web server is able to send the particular information to the client without receiving a request from the client for the particular information.

13. The system of claim 12, wherein the means for executing operations includes means for receiving and processing data from the client.

14. The system of claim 13, wherein the data is compliant with the HTTP protocol or a protocol other than HTTP.

15. The system of claim 13, wherein the data is compliant with the HTTP protocol or a protocol other than HTTP.

16. The system of claim 12, wherein the executing means includes means for creating and communicating data from the CGI to the client.

17. The system of claim 12, wherein the communicating means includes client-side logic configured to perform the two-way asynchronous communication with the CGI.

18. The system of claim 17, wherein the client-side logic is pre-installed on the client.

19. The system of claim 17, wherein the client-side logic is dynamically delivered to the client from the web server.

20. The system of claim 19, wherein the client-side logic is delivered in the form of a Java™ applet.

21. The system of claim 19, wherein the client-side logic is delivered in the form of Macromedia Shockwave movie.

22. The system of claim 12, wherein the communications means includes client side logic written in Java™.

23. The system of claim 12, wherein the CGI is a servlet.

24. A method for enabling two-way asynchronous communication between a client and a web server to occur within a single HTTP transaction, the method comprising:
   a) opening, by the client, one socket connection to the web server;
   b) communicating an HTTP request from the client to the web server over the one socket connection as part of the single HTTP transaction, wherein the HTTP request is a request for the web server to initialize a CGI that operates within or in conjunction with the web server;
   c) initializing, by the web server, the CGI after receiving the HTTP request from the client;
   d) executing, by the CGI after the CGI has been initialized, operations to enable the two-way asynchronous communication between the client and the web server to occur over the one socket connection and wholly within the single HTTP transaction;
   e) closing, by the web server, the one socket connection after the CGI has been terminated;
   wherein the two-way asynchronous communication between the client and the web server over the one socket connection and wholly within the single HTTP transaction allows for sending of particular information from the web server to the client and for sending of information from the client to the web server, said particular information and said information being communicated in a protocol other than HTTP; and
   wherein the web server is able to send the particular information to the client without receiving a request from the client for the particular information.

25. A system for enabling two-way asynchronous communication between a client and a web server to occur within a single HTTP transaction, the system comprising:
   means for opening one socket connection between the client and the web server;
   means for communicating an HTTP request from the client to the web server over the one socket connection as part of the single HTTP transaction, wherein the HTTP request is a request for the web server to initialize a CCI that operates within or in conjunctions with the web server;
   means for initializing the CGI after the web server receives the HTTP request from the client;
   means for executing operations of the CGI after the CGI has been initialized, wherein the operations are configured to enable the two-way asynchronous communication between the client and the web server to occur over the one socket connection and wholly within the single HTTP transaction, the means for executing configured to repeat at least one of the operations until termination of the CGI by the client or the CGI; and
   means for closing the one socket connection after the CGI has been terminated;
   wherein the two-way asynchronous communication between the client and the web server over the one socket connection and wholly within the single HTTP transaction allows for sending of particular information from the web server to the client and for sending of information from the client to the web server, said particular information and said information communicated in a protocol other than HTTP; and
   wherein the web server is able to send the particular information to the client without receiving a request from the client for the particular information.

26. A system for processing distributed applications comprising:
   at least one application context configured to execute an application, the application context comprising a communication interface configured to send and receive application data;
   a communication bus configured to communicate the application data to and from the application context;
   at least one gateway context configured to maintain two-way asynchronous communication between the communication bus and a remote logic, the remote logic being executed by a client; and
   a web server, the web server configured to establish a single socket connection with the client and to receive an HTTP request from the client, the HTTP request comprising a request for two-way asynchronous communication between the remote application and the communication bus, the two-way asynchronous communication to occur within a single HTTP transaction and over the single socket connection.

27. The system of claim 26, wherein the application context comprises an application CGI.

28. The system of claim 27, wherein the web server is configured to communicate with the application CGI.

29. The system of claim 26, wherein the application context is further configured to receive information from an application and to provide a document to a web server.

30. The system of claim 26, wherein the application context comprises an administration CGI, configures to receive information from an application and to provide a document to the web server.

31. The system of claim 26, wherein the at least one gateway context comprises a gateway CGI, the gateway CGI performing the configuration to maintain two-way asynchronous communication between the communication bus and a remote application.

32. The system of claim 26, wherein the gateway context is further configured to maintain the two-way asynchronous communication until termination by the remote application.

33. The system of claim 26, wherein the application context is further configured to format application data retrieved from the application into presentation data that is readable by another application.

34. The system of claim 33, wherein the presentation data is in a format readable by a web browser.

35. The system of claim 33, wherein the format of the presentation data is HTTP.

36. The system of claim 26, further comprising a communication bus extension, the communication bus extension comprising a multiplexer configured to multiplex one or more direct socket connections to the communication bus.

37. The system of claim 26, further comprising a communication bus extension, the communication bus extension configured to publish and subscribe data between applications.

38. The system of claim 26, wherein the communication bus further comprises a filter for filtering the data.

39. The system of claim 38, wherein the filter is configured to filter data according to a filter criteria executed by at least one application.

40. The system of claim 26, wherein the remote logic written in Java™.

* * * * *